United States Patent
Stall

(10) Patent No.: US 7,631,316 B2
(45) Date of Patent: Dec. 8, 2009

(54) METHOD AND APPARATUS FOR PROVIDING AND INTEGRATING HIGH-PERFORMANCE MESSAGE QUEUES IN A USER INTERFACE ENVIRONMENT

(75) Inventor: Jeffrey E Stall, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1155 days.

(21) Appl. No.: 11/138,165

(22) Filed: May 26, 2005

(65) Prior Publication Data

US 2005/0216916 A1 Sep. 29, 2005

Related U.S. Application Data

(63) Continuation of application No. 09/892,951, filed on Jun. 26, 2001, now Pat. No. 6,954,933.

(60) Provisional application No. 60/244,487, filed on Oct. 30, 2000.

(51) Int. Cl.
G06F 3/00 (2006.01)
G06F 9/44 (2006.01)
G06F 9/46 (2006.01)
G06F 13/00 (2006.01)

(52) U.S. Cl. ..................................................... 719/314

(58) Field of Classification Search .................. 719/314
See application file for complete search history.

(56) References Cited

U.S. PATENT DOCUMENTS

| | | | |
|---|---|---|---|
| 5,333,269 A * | 7/1994 | Calvignac et al. | 709/215 |
| 5,434,975 A | 7/1995 | Allen | |
| 5,664,190 A * | 9/1997 | Cohen et al. | 718/100 |
| 5,668,997 A | 9/1997 | Lynch-Freshner | |
| 5,682,537 A * | 10/1997 | Davies et al. | 710/200 |
| 5,801,696 A | 9/1998 | Roberts | |
| 5,831,609 A | 11/1998 | London et al. | |
| 5,906,658 A * | 5/1999 | Raz | 710/39 |
| 5,991,820 A | 11/1999 | Dean | |
| 6,487,652 B1 | 11/2002 | Gomes et al. | |

(Continued)

OTHER PUBLICATIONS

Buzzard et al, Hamlyn: a high-performance network interface with sender-based memory management, Hewlett-Packard Company, Jul. 1995, pp. 1-11.*

(Continued)

*Primary Examiner*—Diem K Cao
(74) *Attorney, Agent, or Firm*—Workman Nydegger

(57) ABSTRACT

A method and apparatus is provided for providing and integrating high-performance message queues. "Contexts" are provided that allow independent worlds to be created and execute in parallel. A context is created with one or more threads. Each object is created with context affinity, allowing any thread inside the context to modify the object or process pending messages. Threads in a different context are unable to modify the object or process pending messages for that context. To help achieve scalability and context affinity, both global and thread-local data is often moved into the context. Remaining global data has independent locks, providing synchronized access for multiple contexts. Each context has multiple message queues to create a priority queue. There are default queues for sent messages and posted messages, carry-overs from legacy window managers, with the ability to add new queues on demand. A queue bridge is also provided for actually processing the messages.

3 Claims, 13 Drawing Sheets

U.S. PATENT DOCUMENTS

| | | | |
|---|---|---|---|
| 6,507,861 | B1 | 1/2003 | Nelson et al. |
| 6,817,018 | B1* | 11/2004 | Clarke et al. ............... 719/313 |
| 6,915,457 | B1* | 7/2005 | Miller ......................... 714/43 |
| 6,961,945 | B2 | 11/2005 | Stall |
| 2005/0028167 | A1 | 2/2005 | Stall |
| 2005/0055701 | A1 | 3/2005 | Stall |

OTHER PUBLICATIONS

Michael et al, Simple, Fast, and Practical Non-Blocking and Blocking Concurrent Queue Algorithms, ACM, 1996, pp. 267-275.*

Calo, S.B., "Delay Analysis of a Two-Queue, Nonuniform Message Channel,"*IBM Journal of Research and Development* 25(6):915-929, Nov. 1981.

Cownie, J., et al., "A Standard Interface for Debugger Access to Message Queue Information in MPI," *Proceedings of the Conference for the Recent Advances in Parallel Virtual Machine and Message Passing Interface. 6th European PVM/ MPI Users' Group Meeting*, Barcelona, Spain, Sep. 26-29, 1999, pp. 51-58.

Horrell, S., "Microsoft Message Queue (MSMQ)," *Enterprise Middleware*, Jul. 1999, pp. 20-31.

Michael, M. M., and M. L. Scott, "Simple, Fast, and Practical Non-Blocking Concurrent Queue Algorithms," *Proceedings of the 15th Annual Assoc. for Computing Machinery Symposium on Principles of Distributed Computing*,Philadelphia, Penn., May 23-26, 1996, pp. 267-275.

Neal, R.M., et al., "Inter-Process Communication in a Distributed Programming Environment," *Proceedings of the Conference of the Canadian Information Processing Society, Session 84: Images of Fear/Images of HOPE*, Calgary, Alberta, Canada, May 9, 1984, pp. 361-364.

Pietrek, M., "Inside the Windows Scheduler," *Dr. Dobb's Journal* 17(8):64, 66-68, 70-71, Aug. 1992.

Rauschenberger, J., "Fast Concurrent Message Queuing," *Visual Basic Programmer's Journal* 9(1):60-62, 64, 67, 69, 71, Jan. 1999.

Shaw, R.H., "Integrating Subsystems and Interprocess Communication in an OS/2 Application," *Microsoft Systems Journal* 4(6):47-60, 80, Nov. 1989.

Uyehara, R.S., "Suspend Message Queue," *IBM Technical Disclosure Bulletin* 24(6):2811-2812, Nov. 1981.

Office Action mailed Jan. 11, 2008 cited in Related U.S. Appl. No. 10/930,114.

Office Action dated Jul. 1, 2004 cited in U.S. Appl. No. 09/892,951 (Copy Attached).

Notice of Allowance dated May 3, 2005 cited in U.S. Appl. No. 09/892,951 (Copy Attached).

Notice of Allowance dated Oct. 15, 2008 cited in U.S. Appl. No. 10/930,114 (Copy Attached).

Office Action dated Sep. 2, 2009 cited in U.S. Appl. No. 10/930,124 (Copy Attached).

\* cited by examiner

METHOD AND APPARATUS FOR PROVIDING AND INTEGRATING HIGH-PERFORMANCE MESSAGE QUEUES IN A USER INTERFACE ENVIRONMENT

CROSS-REFERENCE(S) TO RELATED APPLICATIONS

This application is a continuation of U.S. application Ser. No. 09/892,951 filed Jun. 26, 2001, which claims the benefit of U.S. provisional patent application No. 60/244,487, filed Oct. 30, 2000, which are expressly incorporated herein by reference.

FIELD OF THE INVENTION

This invention generally relates to the field of computing devices with graphical user interfaces. More specifically, this invention relates to providing high-performance message queues and integrating such queues with message queues provided by legacy user interface window managers.

BACKGROUND OF THE INVENTION

Graphical user interfaces typically employ some form of a window manager to organize and render windows. Window managers commonly utilize a window tree to organize windows, their child windows, and other objects to be displayed within the window such as buttons, menus, etc. To display the windows on a display screen, a window manager parses the window tree and renders the windows and other user interface objects in memory. The memory is then displayed on a video screen. A window manager may also be responsible for "hit-testing" input to identify the window in which window input was made. For instance, when a user moves a mouse cursor over a window and "clicks," the window manager must determine the window in which the click was made and generate a message to that window.

In some operating systems, such as Windows®NT from the Microsoft®Corporation of Redmond, Wash., there is a single window manager that threads in all executing processes call into. Because window manager objects are highly interconnected, data synchronization is achieved by taking a system-wide "lock". Once inside this lock, a thread can quickly modify objects, traverse the window tree, or any other operations without requiring additional locks. As a consequence, this allows only a single thread into the messaging subsystem at a time. This architecture provides several advantages in that many operations require access to many components and also provides a greatly simplified programming model that eliminates most deadlock situations that would arise when using multiple window manager objects.

Unfortunately, a system-wide lock seriously hampers the communications infrastructure between user interface components on different threads by allowing only a single message to be en-queued or de-queued at a time. Furthermore, such an architecture imposes a heavy performance penalty on component groups that are independent of each other and could otherwise run in parallel on independent threads.

One solution to these problems is to change from a system-wide (or process-wide) lock to individual object locks that permits only objects affected by a single operation to be synchronized. This solution actually carries a heavier performance penalty, however, because of the number of locks introduced, especially in a world with control composition. Such a solution also greatly complicates the programming model.

Another solution involves placing a lock on each user interface hierarchy, potentially stored in the root node of the window tree. This gives better granularity than a single, process-wide lock, but imposes many restrictions when performing cross tree operations between inter-related trees. This also does not solve the synchronization problem for non-window user interface components that do not exist in a tree.

Therefore, in light of the above, there is a need for a method and apparatus for providing high-performance message queues in a user interface environment that does not utilize a system-wide lock but that minimizes the number of locked queues. There is a further need for a method and apparatus for providing high-performance message queues in a user interface environment that can integrate a high-performance non-locking queue with a queue provided by a legacy window manager.

SUMMARY OF THE INVENTION

The present invention solves the above-problems by providing a method and apparatus for providing and integrating high-performance message queues in a user interface environment. Generally described, the present invention provides high-performance message queues in a user interface environment that can scale when more processors are added. This infrastructure provides the ability for user interface components to run independently of each other in separate "contexts." In practice, this allows communication between different components at a rate of 10-100 times the number of messages per second than possible in previous solutions.

More specifically described, the present invention provides contexts that allow independent "worlds" to be created and execute in parallel. A context is created with one or more threads. Each object is created with context affinity, which allows only threads associated with the context to modify the object or process pending messages. Threads associated with another context are unable to modify the object or process pending messages for that context.

To help achieve scalability and context affinity, both global and thread-local data may be moved into the context. Remaining global data has independent locks that provide synchronized access for multiple contexts. Each context also has multiple message queues that together create a priority queue. There are default queues for "sent" messages and "posted" messages, carry-overs from legacy window managers, and new queues may be added on demand. A queue bridge is also provided for actually processing the messages that may be integrated with a legacy window manager.

The present invention also provides a method, computer-controlled apparatus, and a computer-readable medium for providing and integrating high-performance message queues in a user interface environment.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention is directed to a method and apparatus for providing high-performance message queues and for integrating these queues with message queues provided by legacy window managers. Aspects of the invention may be embodied in a computer executing an operating system capable of providing a graphical user interface.

As will be described in greater detail below, the present invention provides a reusable, thread-safe message queue that provides "First in, All Out" behavior, allowing individual messages to be en-queued by multiple threads. By creating multiple instances of these low-level queues, a higher-level priority queue can be built for all window manager messages. According to one actual embodiment of the present invention, a low-level queue is provided that does not have synchronization and is designed to be used by a single thread. According to another actual embodiment of the present invention, a low-level queue is provided that has synchronization and is designed to be safely accessed by multiple threads. Because both types of queues expose common application programming interfaces ("APIs"), the single threaded queue can be viewed as an optimized case of the synchronized queue.

As also will be described in greater detail below, the thread-safe, synchronized queue, is built around "S-Lists." S-Lists are atomically-created singly linked lists. S-Lists allow multiple threads to en-queue messages into a common queue without taking any "critical section" locks. By not using critical sections or spin-locks, more threads can communicate using shared queues than in previous solutions because the atomic changes to the S-List do not require other threads to sleep on a shared resource. Moreover, because the present invention utilizes atomic operations available in hardware, a node may be safely added to an S-List on a symmetric multi-processing ("SMP") system in constant-order time. De-queuing is also performed atomically. In this manner, the entire list may be extracted and made available to other threads. The other threads may continue adding messages to be processed.

Figure 1:
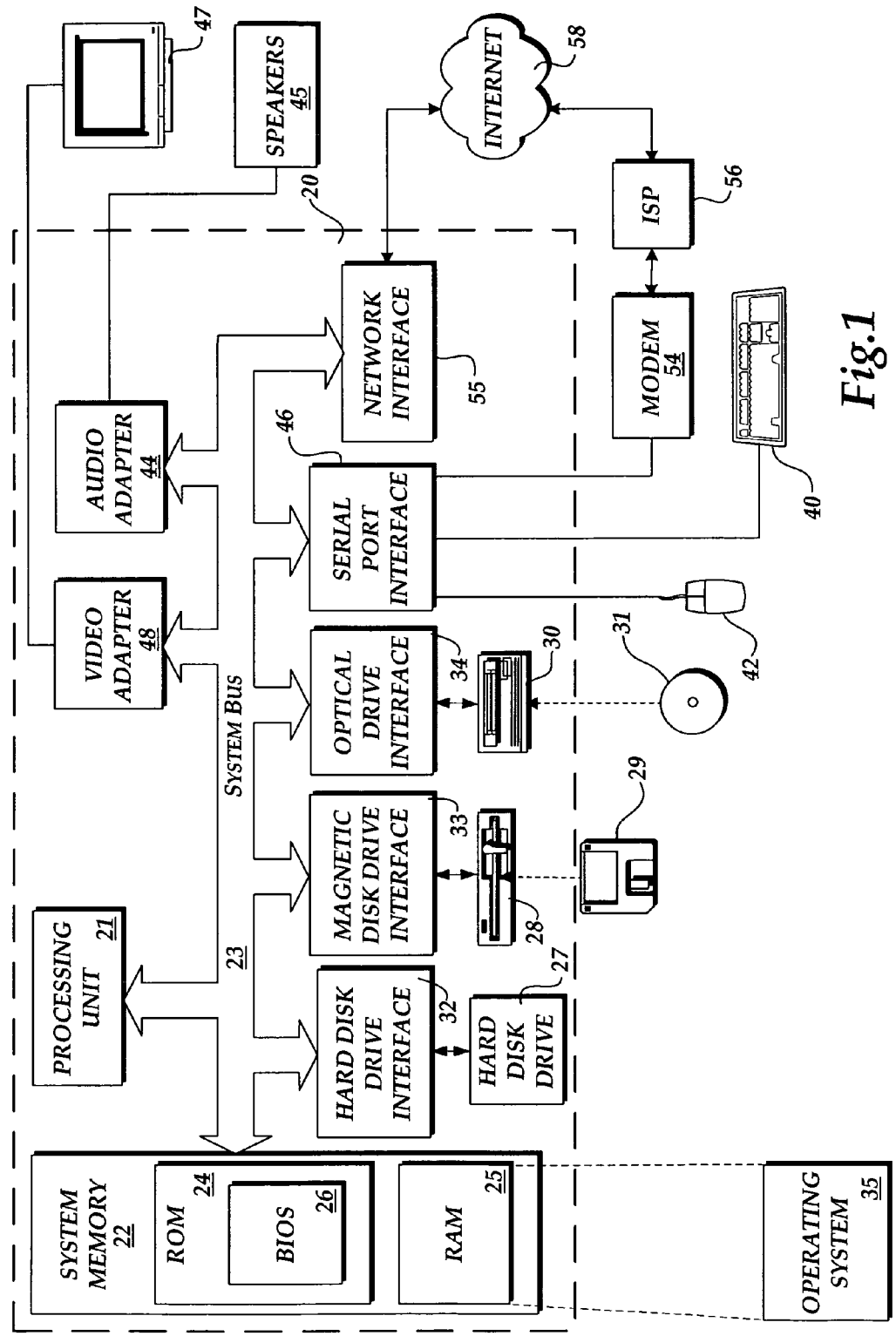
FIG. 1 is a block diagram showing an illustrative operating environment for an actual embodiment of the present invention.

Referring now to the figures, in which like numerals represent like elements, an actual embodiment of the present invention will be described. Turning now to FIG. 1, an illustrative personal computer 20 for implementing aspects of the present invention will be described. The personal computer 20 comprises a conventional personal computer, including a processing unit 21, a system memory 22, and a system bus 23 that couples the system memory to the processing unit 21. The system memory 22 includes a read only memory ("ROM") 24 and a random access memory ("RAM") 25. A basic input/output system 26 ("BIOS") containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media such as a Digital Versatile Disk ("DVD").

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. As described herein, computer-readable media may comprise any available media that can be accessed by the personal computer 20. By way of example, and not limitation, computer-readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other solid-state memory technology, CD-ROM, DVD or other optical storage, magnetic cassettes, magnetic tape, magnetic disk storage or other magnetic storage devices, or any other medium which can be used to store the desired information and which can be accessed by the personal computer 20.

A number of program modules may be stored in the drives and RAM 25, including an operating system 35, such as Windows®98, Windows®2000, or Windows®NT from Microsoft® Corporation. As will be described in greater detail below, aspects of the present invention are implemented within the operating system 35 in the actual embodiment of the present invention described herein.

A user may enter commands and information into the personal computer 20 through input devices such as a keyboard 40 or a mouse 42. Other input devices (not shown) may include a microphone, touchpad, joystick, game pad, satellite dish, scanner, or the like. These and other input devices are often connected to the processing unit 21 through a serial port interface 46 that is coupled to the system bus 23, but may be connected by other interfaces, such as a game port or a universal serial bus ("USB"). A monitor 47 or other type of display device is also connected to the system bus 23 via a display interface, such as a video adapter 48. In addition to the monitor, the personal computer 20 may include other peripheral output devices, such as speakers 45 connected through an audio adapter 44 or a printer (not shown).

As described briefly above, the personal computer 20 may operate in a networked environment using logical connections to one or more remote computers through the Internet 58. The personal computer 20 may connect to the Internet 58 through a network interface 55. Alternatively, the personal computer 20 may include a modem 54 and use an Internet Service Provider ("ISP") 56 to establish communications with the Internet 58. The modem 54, which may be internal or external, is connected to the system bus 23 via the serial port interface 46. It will be appreciated that the network connections shown are illustrative and other means of establishing a communications link between the personal computer 20 and the Internet 58 may be used.

Figure 2:
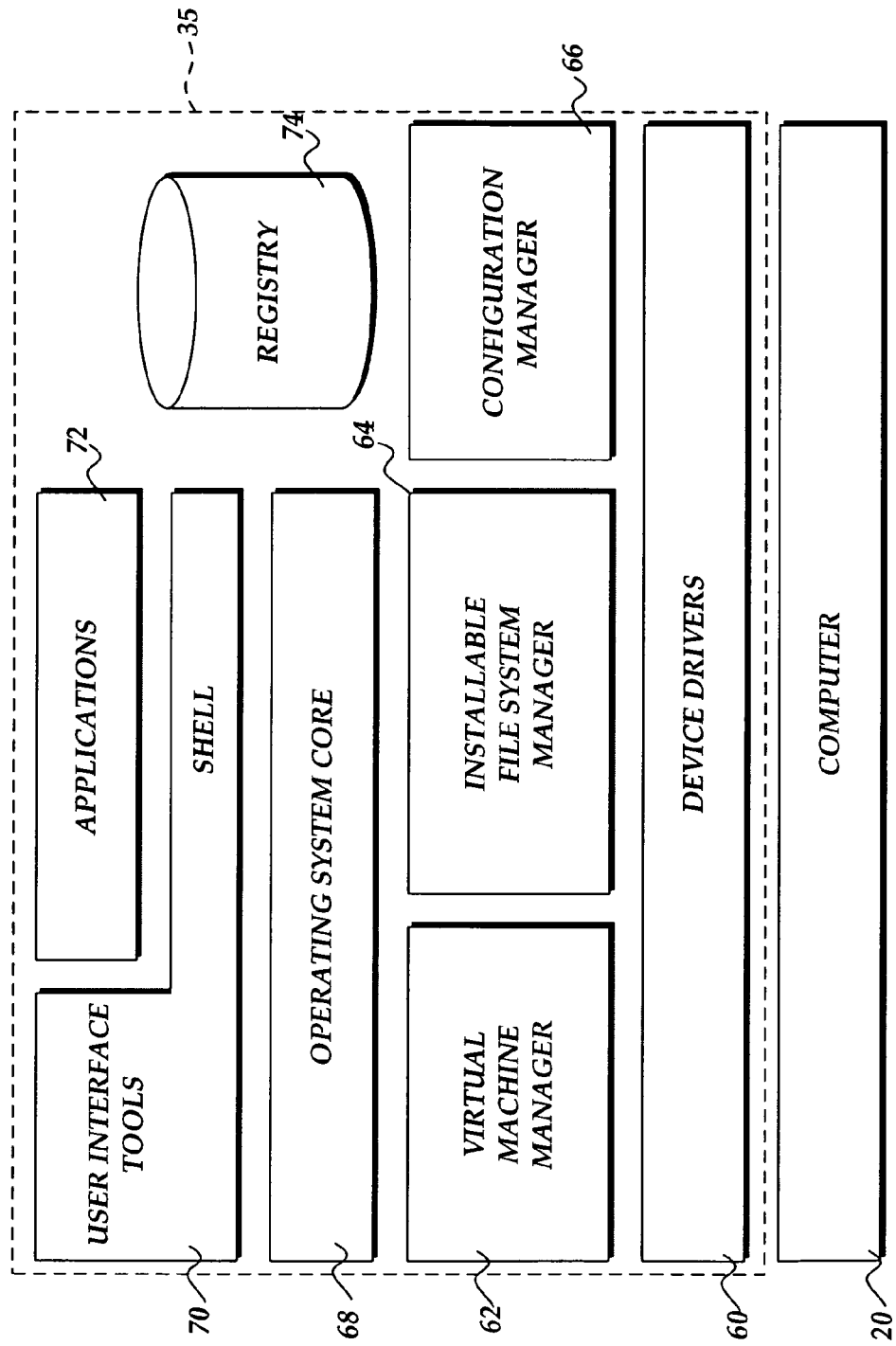
FIG. 2 is a block diagram showing aspects of an operating system utilized in conjunction with the present invention.

Referring now to FIG. 2, additional aspects of the operating system 35 will be described. The operating system 35 comprises a number of components for executing applications 72 and for communicating with the hardware that comprises the personal computer 20. At the lowest level, the operating system 35 comprises device drivers 60 for communicating with the hardware of the personal computer 20. The operating system 35 also comprises a virtual machine manager 62, an installable file system manager 64, and a configuration manager 66. Each of these managers may store information regarding the state of the operating system 35 and the hardware of the personal computer 20 in a registry 74. The operating system 35 also provides a shell 70, which includes user interface tools. An operating system core 68 is also provided which supplies low-level functionality and hardware interfaces. According to the embodiment of the present invention described herein, aspects of the present invention are implemented in the operating system core 68. The operating system core 68 is described in greater detail below with respect to FIG. 3.

Figure 3:
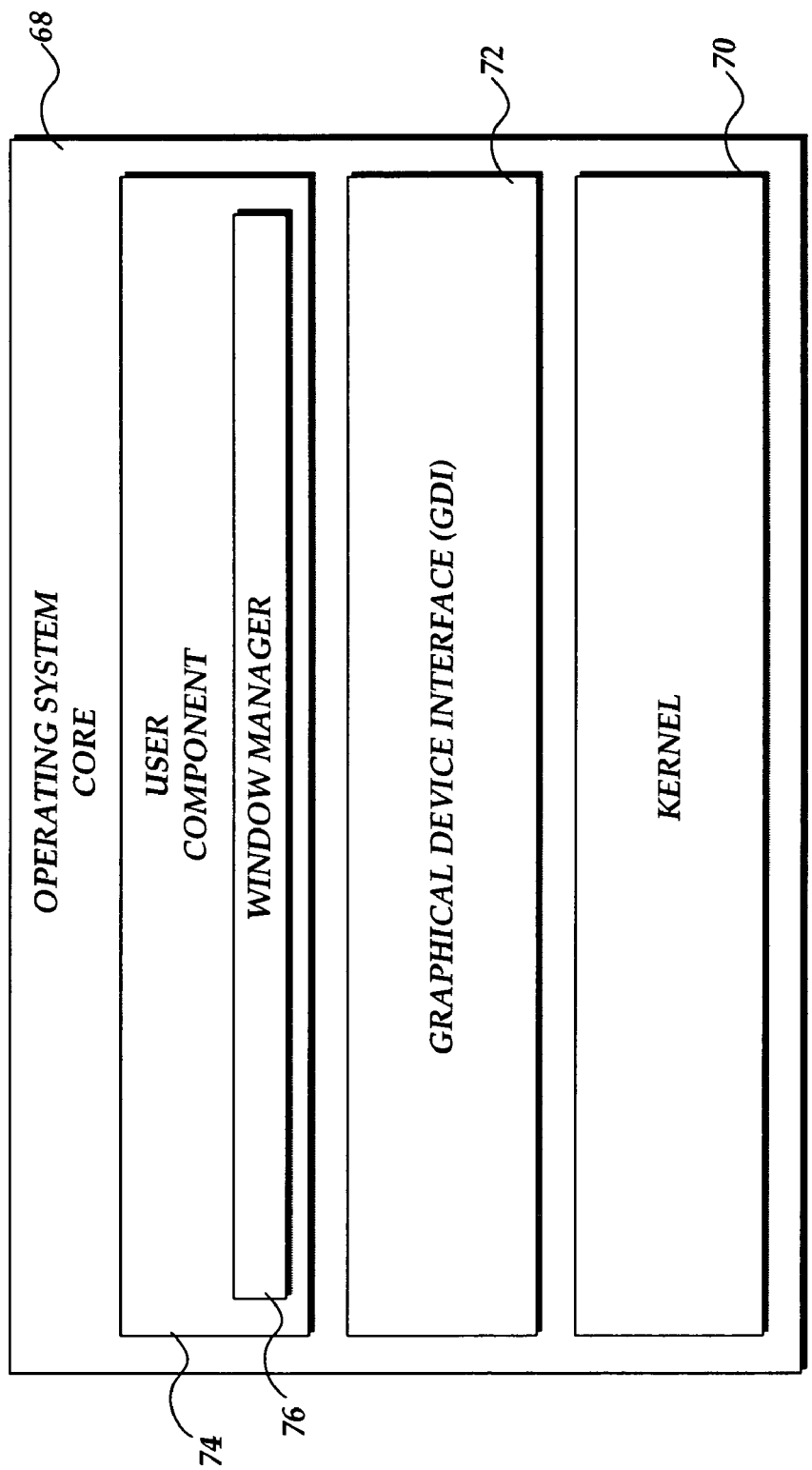
FIG. 3 is a block diagram illustrating additional aspects of an operating system utilized in conjunction with the present invention.

Turning now to FIG. 3, an illustrative operating system core 68 will be described. As mentioned above, the Windows® operating system from the Microsoft® Corporation provides an illustrative operating environment for the actual embodiment of the present invention described herein. The operating system core 68 of the Windows® operating system comprises three main components: the kernel 70; the graphical device interface ("GDI") 72; and the User component 74. The GDI 72 is a graphical system that draws graphic primitives, manipulates bitmaps, and interacts with device-independent graphics drivers, including those for display and printer output devices. The kernel 70 provides base operating system functionality, including file I/O services, virtual memory management, and task scheduling. When a user wants to start an application, the kernel 70 loads the executable ("EXE") and dynamically linked library ("DLL") files for the application. The kernel 70 also provides exception handling, allocates virtual memory, resolves import references, and supports demand paging for the application. As an application runs, the kernel 70 schedules and runs threads of each process owned by an application.

The User component 74 manages input from a keyboard, mouse, and other input devices and output to the user interface (windows, icons, menus, and so on). The User component 74 also manages interaction with the sound driver, timer, and communications ports. The User component 74 uses an asynchronous input model for all input to the system and applications. As the various input devices generate interrupts, an interrupt handler converts the interrupts to messages and sends the messages to a raw input thread area, which, in turn, passes each message to the appropriate message queue. Each Win32-based thread may have its own message queue.

In order to manage the output to the user interface, the User component 74 maintains a window manager 76. The window manager 76 comprises an executable software component for keeping track of visible windows and other user interface objects, and rendering these objects into video memory. Aspects of the present invention may be implemented as a part of the window manager 74. Also, although the invention is described as implemented within the Windows® operating system, those skilled in the art should appreciate that the present invention may be advantageously implemented within any operating system that utilizes a windowing graphical user interface.

Figure 4:
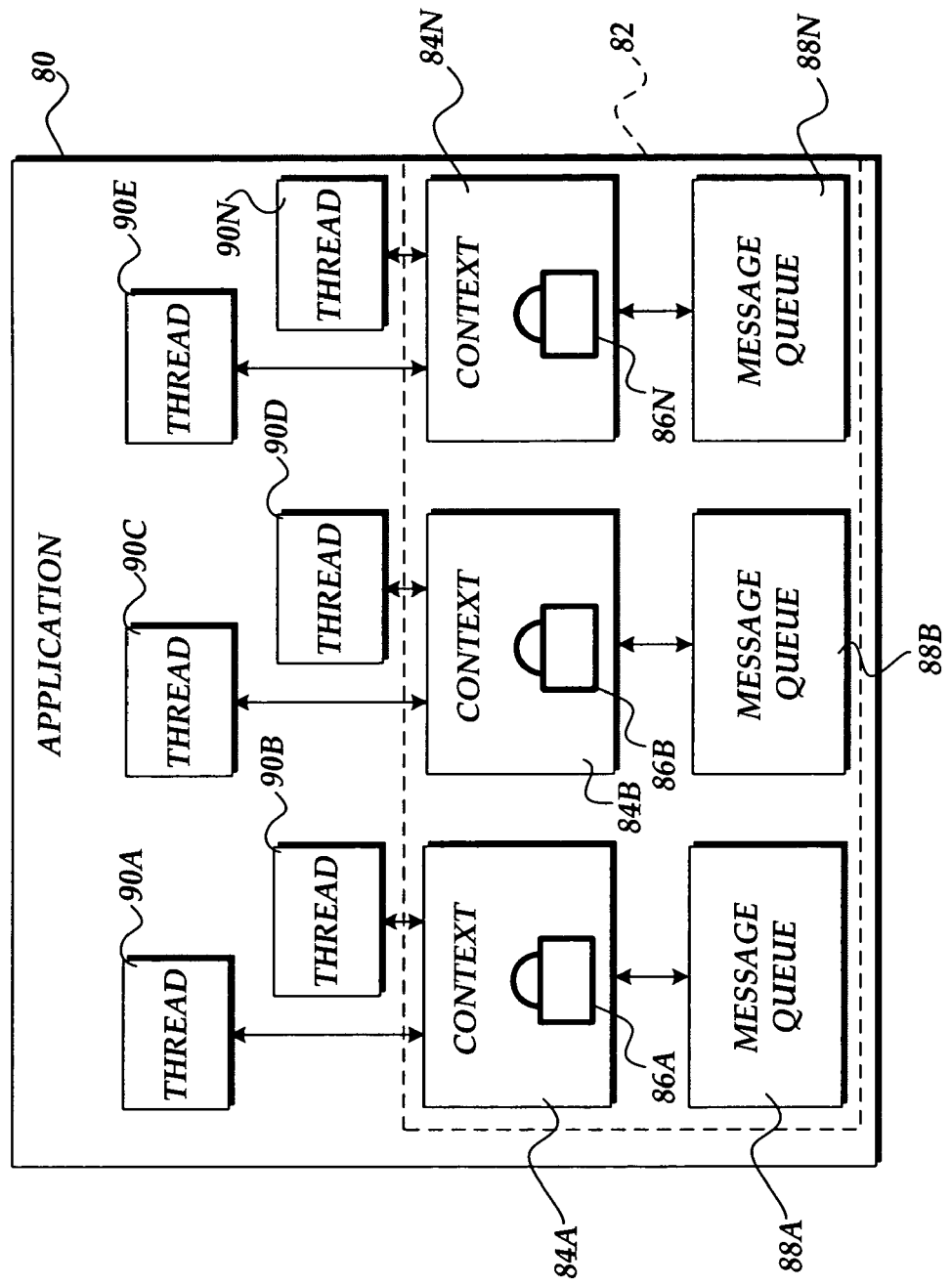
FIG. 4 is a block diagram showing an illustrative software architecture for aspects of the present invention.

Referring now to FIG. 4, additional aspects of the present invention will be described. As shown in FIG. 4, the present invention provides a new system component for providing message queues 88A-88N to threads 90A-90N executing within an application 80. According to an embodiment of the invention, the new system component provides separate contexts 84A-84N. Each message queue 88A-88N is associated with a corresponding context 84A-84N. Any thread 90A-90N in a given context 84A-84N can process messages in the context's message queue. Threads 90A-90N can send messages to other threads by utilizing their respecting message queues 88A-88N. Contexts 84A-84N also maintain locks 86A-86N. As will be described in greater detail below, threads 90A-90N within a particular context can send messages to other threads 90A-90N within the same context without utilizing the message queue 88A-88N. Moreover, the message queues 88A-88N associated with each context 84A-84N are implemented as non-locking using "atomic" hardware instructions known to those skilled in the art. Aspects of the present invention for sending messages, posting messages, and processing messages will be described below with respect to FIGS. 6-12.

Figure 5:
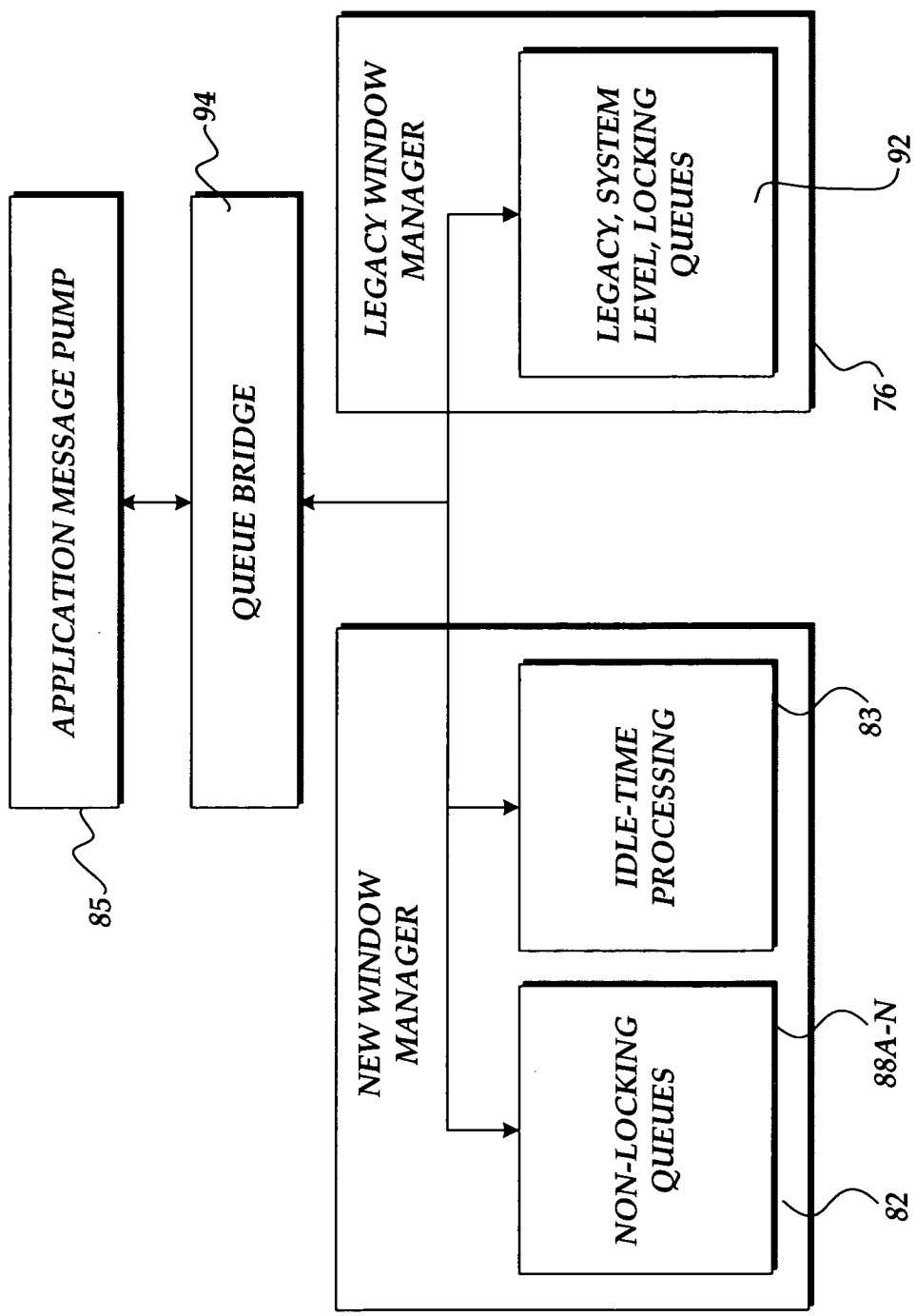
FIG. 5 is a block diagram showing an illustrative software architecture for additional aspects of the present invention.

Referring now to FIG. 5, additional aspects of the present invention will be described. As mentioned briefly above, in addition to providing high-performance message queues, the present invention also provides a method and apparatus for interfacing such queues with legacy window managers. According to the actual embodiment of the invention described herein, a queue bridge 94 is provided between a new window manager 84 having non-locking queues 88A-N and a legacy window manager 76, such as the window manager provided in the User component of Windows NT®.

The queue bridge 94 satisfies all of the requirements of the User component message queue 92, including: on legacy systems, only GetMessage( ), MsgWaitForMultipleObjectsEx( ) and WaitMsg( ) can block the thread until a queue has an available message; once ready, only GetMessage( ) or PeekMessage( ) can be used to remove one message; legacy User component queues for Microsoft Windows®5 or Microsoft Windows® NT/4 require all messages to be processed between calls of MsgWaitForMultipleObjectsEx( ); only the queue on the thread that created the HWND can receive messages for that window; the application must be able to use either ANSI or UNICODE versions of APIs to ensure proper data processing; and all messages must be processed in FIFO nature, for a given mini-queue.

Later versions of Microsoft Windows® have been modified to expose message pump hooks ("MPH") which allow a program to modify system API implementations. As known to those skilled in the art, a message pump 85 is a program loop that receives messages from a thread's message queue, translates them, offers them to the dialog manager, informs the Multiple Document Interface ("MDI") about them, and dispatches them to the application.

The queue bridge 94 also satisfies the requirements of the window manager having non-locking queues 82, such as: operations on the queues must not require any locks, other than interlocked operations; any thread inside the context that owns a Visual Gadget may process messages for that Visual Gadget; and multiple threads may try to process messages for a context simultaneously, but all messages must be processed in FIFO nature, for a given queue.

The queue bridge 94 also provides functionality for extensible idle time processing 83, including animation processing, such as: objects must be able to update while the user interface is waiting for new messages to process; the user interface must be able to perform multiple animations on different objects simultaneously in one or more threads; new animations may be built and started while the queues are already waiting for new messages; animations must not be blocked waiting for a new message to become available to exit the wait cycle; and the overhead of integrating these continuous animations with the queues must not incur a significant CPU performance penalty. The operation of the queue bridge 94 will be described in greater detail below with reference to FIG. 13.

Figure 6:
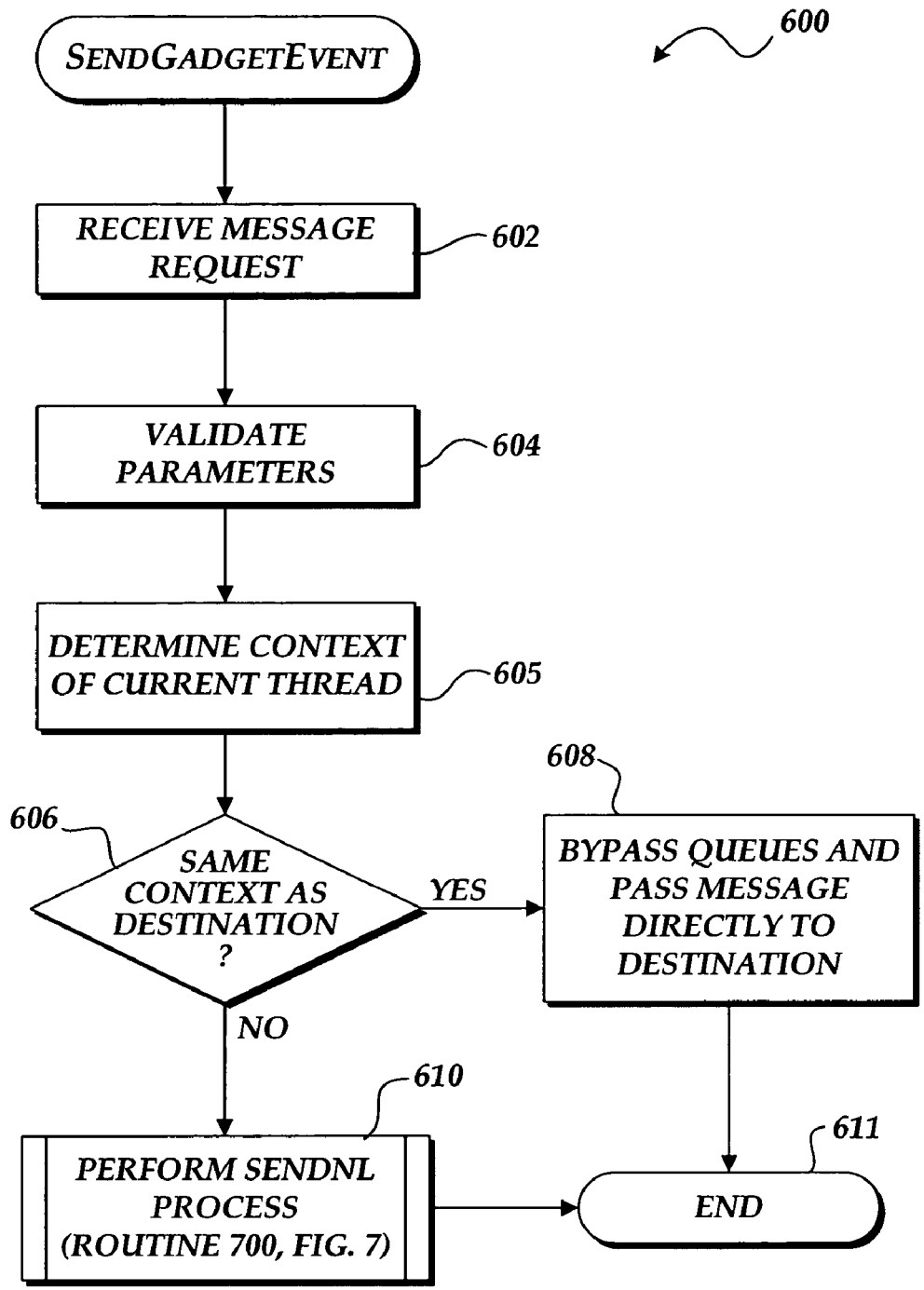
FIG. 6 is a flow diagram showing an illustrative routine for transmitting a message between user interface objects according to an actual embodiment of the present invention.

Referring now to FIG. 6, an illustrative Routine 600 will be described for sending a Visual Gadget event, or message. The Routine 600 begins at block 602, where the message request is received. Routine 600 continues from block 602 to block 604, where parameters received with the message request are validated. From block 604, the Routine 600 continues to block 605, where the context associated with the current thread is determined. The Routine 600 then continues to block 606, where a determination is made as to whether the context of the current thread is the same as the context of the thread for which the message is destined. If the contexts are the same, the Routine 600 branches to block 608, where the queues are bypassed and the message is transmitted from the current thread directly to the destination thread. Sending a message to a component that has the same context (see below) is the highest priority message and can be done bypassing all queues. From block 608, the Routine 600 continues to block 611, where it ends.

If, at block 606, it is determined that the source and destination contexts are not the same, the Routine 600 continues from block 606 to block 610, where the SendNL process is called. As will be described in detail below with respect to FIG. 7, the SendNL process sends a message to a non-locking queue in another context. From block 610, the Routine 600 continues to block 611, where it ends.

Figure 7:
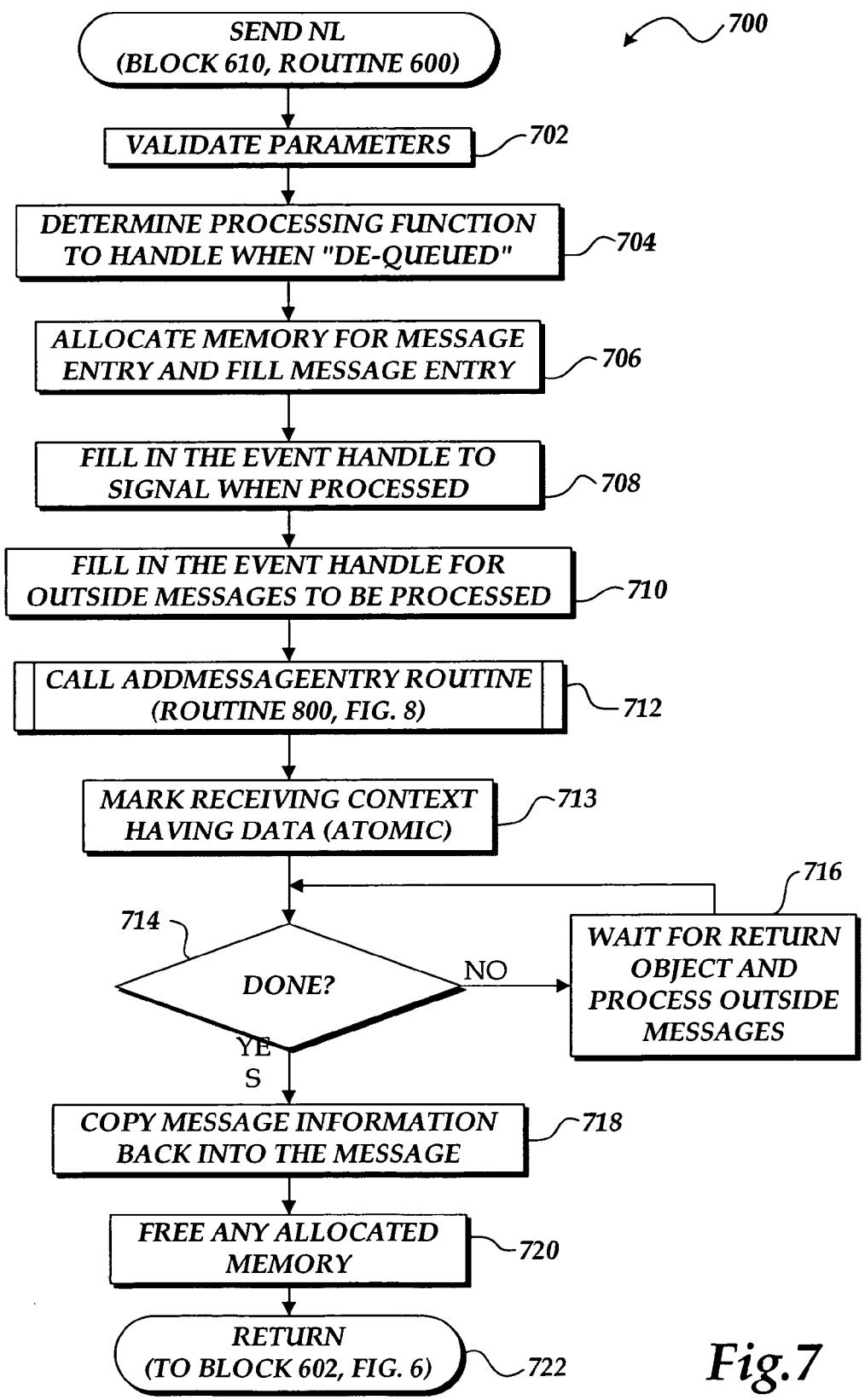
FIG. 7 is a flow diagram showing an illustrative routine for transmitting a message from one user interface component to another user interface component in another context according to an actual embodiment of the present invention.

Turning now to FIG. 7, a Routine 700 will be described that illustrates the SendNL process for sending a message to a component that has a different context. Sending a message to a component that has a different context requires the message to be en-queued onto the receiving context's "sent" message queue, with the sending thread blocking until the message has been processed. Once the message has been processed, the message information must be recopied back, since the message processing may fill in "out" arguments for return values. "Sending" a message is higher-level functionality built on top of the message queue.

The Routine 700 begins at block 702, where the parameters received with the message are validated. The Routine 702 then continues to block 704, where a processing function to handle when the message is "de-queued" is identified. The Routine 700 then continues to block 706 where memory is allocated for the message entry and the message entry is filled with the passed parameters. The Routine 700 then continues to block 708, where an event handle signaling that the message has been processed is added to the message entry. Similarly, at block 710, an event handle for processing outside messages received while the message is being processed is added to the message entry. At block 712, the AddMessageEntry routine is called with the message entry. The AddMessageEntry routine atomically adds the message entry to the appropriate message queue and is described below with respect to FIG. 8.

Routine 700 continues from block 712 to block 713, where the receiving context is marked as having data. This process is performed "atomically." As known to those skilled in the art, hardware instructions can be used to exchange the contents of memory without requiring a critical section lock. For instance, the "CMPXCHG8B" instruction of the Intel 80×86 line of processors accomplishes such a function. Those skilled in the art should appreciate that similar instructions are also available on other hardware platforms.

From block 713, the Routine 700 continues to block 714, where a determination is made as to whether the message has been processed. If the message has not been processed, the Routine 700 branches to block 716, where the thread waits for a return object and processes outside messages if any become available. From block 716, the Routine 700 returns to block 714 where an additional determination is made as to whether the message has been processed. If, at block 714, it is determined that the message has been processed, the Routine 700 continues to block 718. At block 718, the processed message information is copied back into the original message request. At block 720, any allocated memory is de-allocated. The Routine 700 then returns at block 722.

Figure 8:
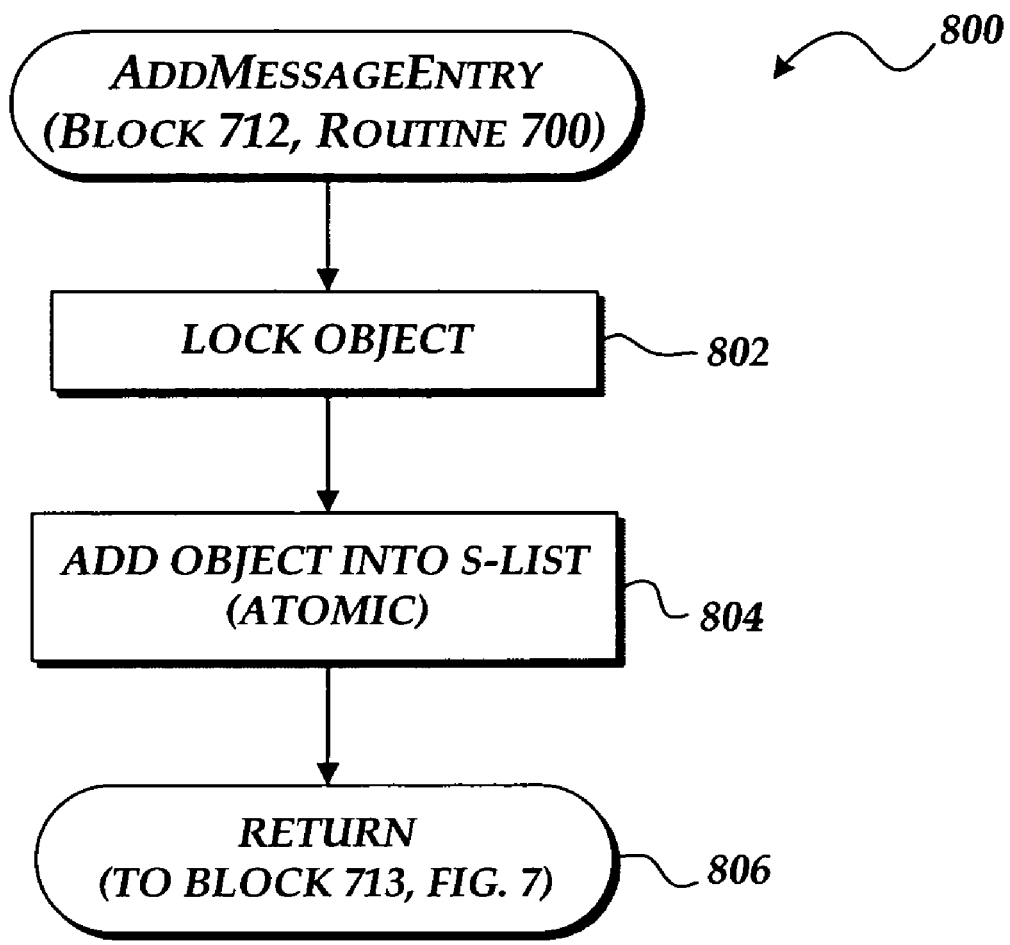
FIG. 8 is a flow diagram showing an illustrative routine for atomically adding an object into an s-list according to an actual embodiment of the present invention.

Referring now to FIG. 8, an illustrative Routine 800 will be described for adding a message entry to a queue. The Routine 800 begins at block 802, where the object is locked so that it cannot be fully destroyed. The Routine 800 then continues to block 804, where the object is atomically added onto the queue. As briefly described above, according to an embodiment of the invention, the queue is implemented as an S-list. An S-list is a singly-linked list that can add a node, pop a node, or remove all nodes atomically. From block 804, the Routine 800 continues to block 806, where it returns.

Figure 9:
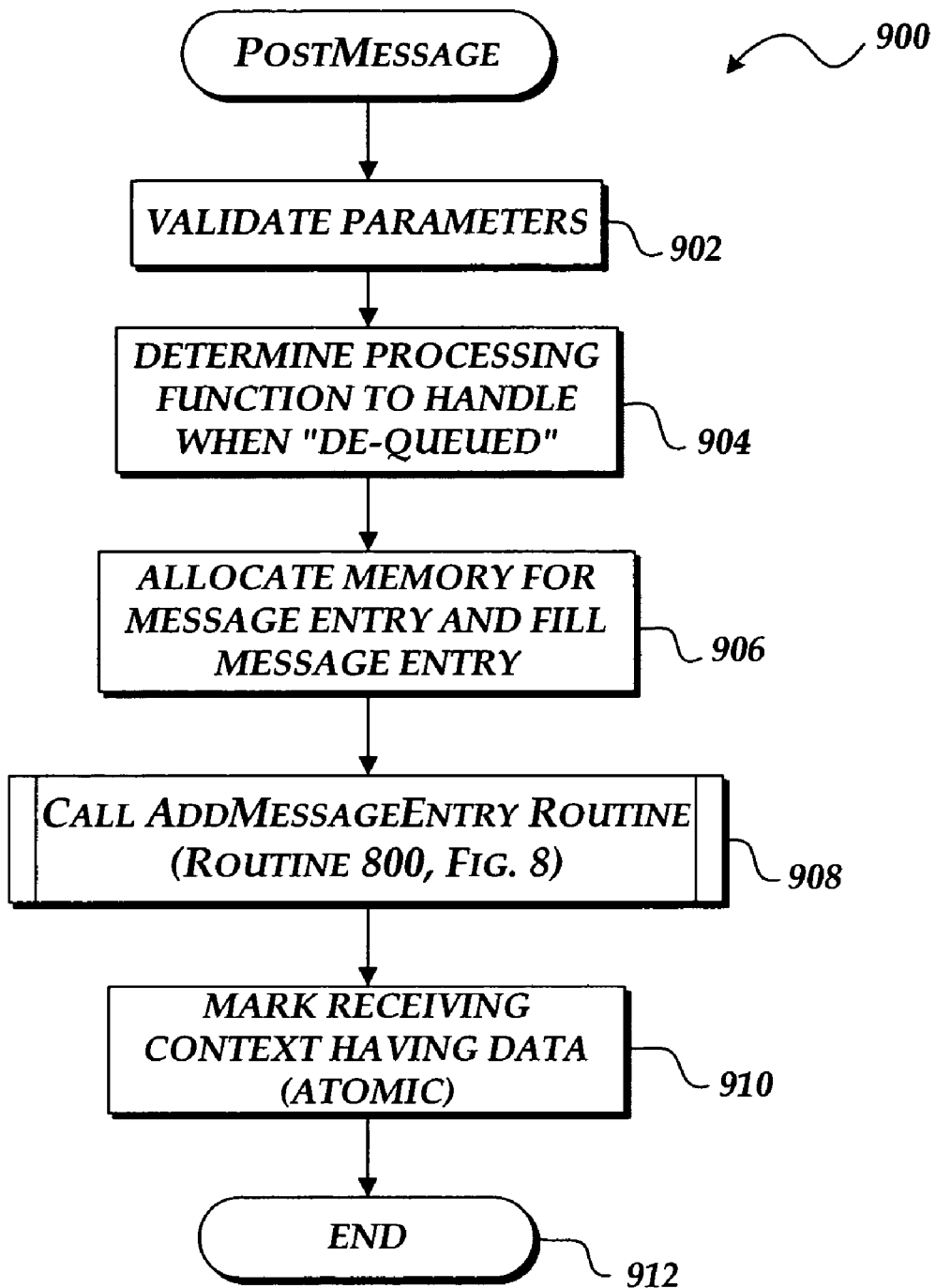
FIG. 9 is a flow diagram showing an illustrative routine for posting a message according to an actual embodiment of the present invention.

Referring now to FIG. 9, an illustrative Routine 900 will be described for "posting" a message to a queue. Messages posted to a component in any context must be deferred until the next time the application requests processing of messages. Because a specific thread may exit after posting a message, the memory may not be able to be returned to that thread. In this situation, memory is allocated off the process heap, allowing the receiving thread to safely free the memory.

The Routine 900 begins at block 902, where the parameters received with the post message request are validated. The Routine 900 then continues to block 904, where the processing function that should be notified when the message is "de-queued" is identified. At block 906, memory is allocated for the message entry and the message entry is filled with the appropriate parameters. The Routine 900 then continues to block 908, where the AddMessageEntry routine is called. The AddMessageEntry routine is described above with reference to FIG. 8. From block 908, the Routine 900 continues to block 910, where the receiving context is atomically marked as having data. The Routine 900 then continues to block 912, where it ends.

Figure 10:
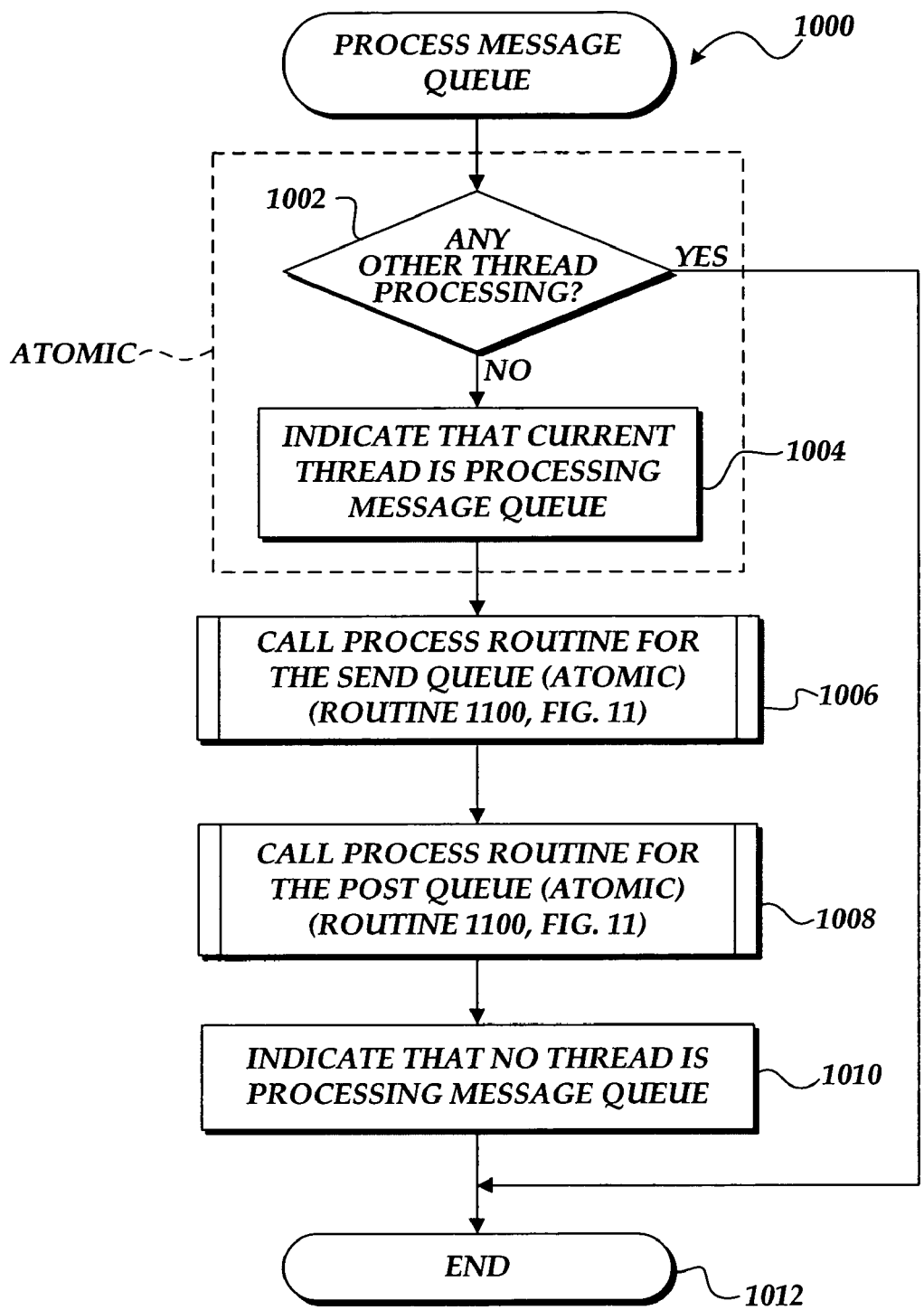
FIG. 10 is a flow diagram showing an illustrative routine for processing a message queue according to an actual embodiment of the present invention.

Referring now to FIG. 10, an illustrative Routine 1000 will be described for processing a message queue. As mentioned briefly above, only one thread is allowed to process messages at a given time. This is necessary to ensure that all messages are processed in a first-in first-out ("FIFO") order. When a thread is ready to process messages for a given message queue, because of the limitations of S-Lists, all messages must be de-queued. After the list is de-queued, the singly-linked list must be converted from a stack into a queue, giving the messages first-in, first-out ("FIFO") ordering. At this point, all entries in the queue may be processed.

The Routine 1000 begins at block 1002, where a determination is atomically made as to whether any other thread is currently processing messages. If another thread is processing, the Routine 1000 branches to block 1012. If no other thread is processing, the Routine 1002 continues to block 1004, where an indication is atomically made that the current thread is processing the message queue. From block 1004, the Routine 1000 continues to block 1006, where a routine for atomically processing the sent message queue is called. Such a routine is described below with respect to FIG. 11.

From block 1006, the Routine 1000 continues to block 1008, where routine for atomically processing the post message queue is called. Such a routine is described below with respect to FIG. 11. The Routine 1000 then continues to block 1010 where an indication is made that no thread is currently processing the message queue. The Routine 1000 then ends at block 1012.

Figure 11:
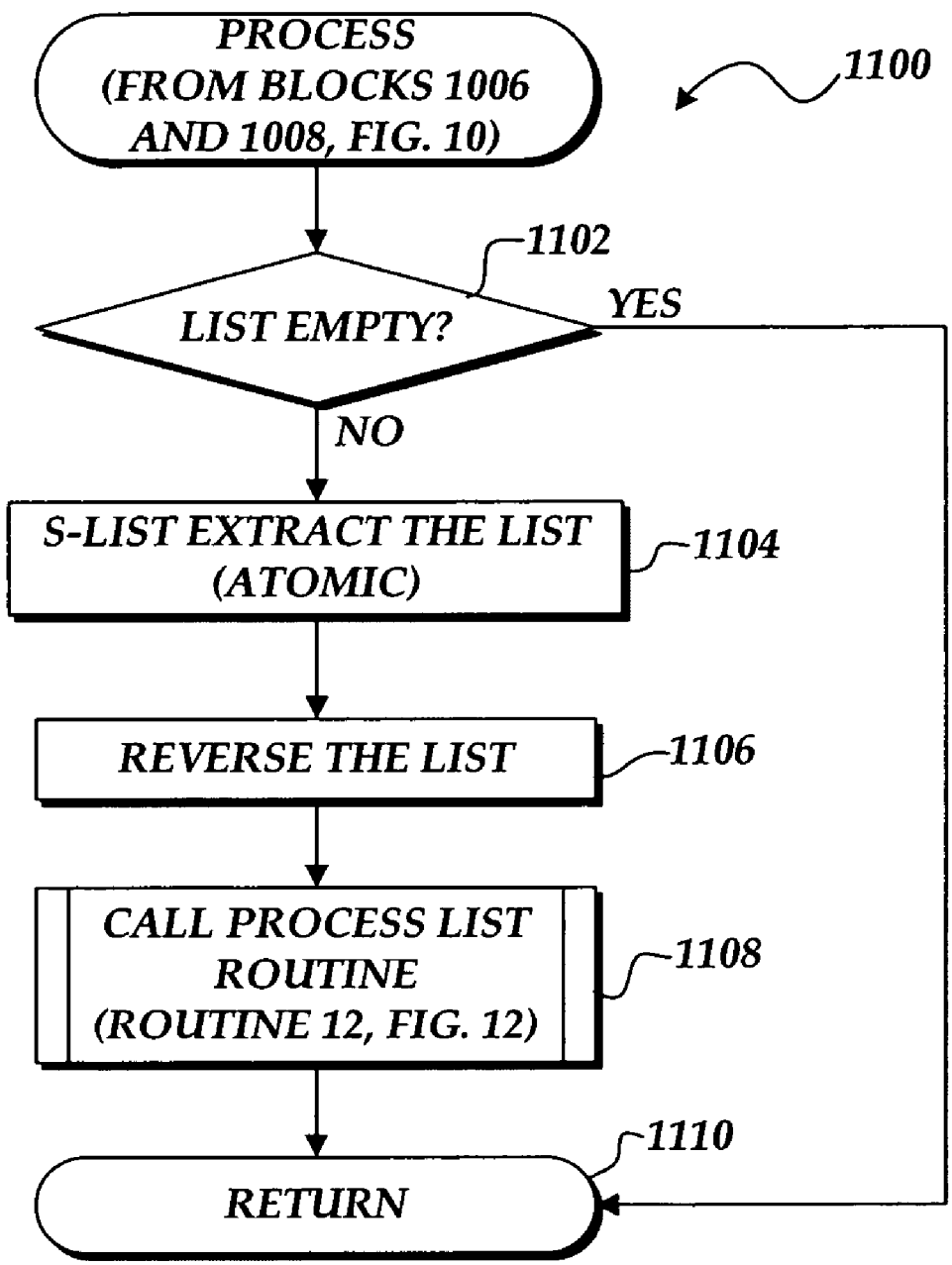
FIG. 11 is a flow diagram showing additional aspects an illustrative routine for processing a message queue according to an actual embodiment of the present invention.

Referring now to FIG. 11, an illustrative Routine 1100 will be described for processing the send and post message queues. The Routine 1100 begins at block 1102, where a determination is made as to whether the S-list is empty. If the S-list is empty, the Routine 1100 branches to block 1110, where it returns. If the S-list is not empty, the Routine 1100 continues to block 1104, where the contents of the S-list are extracted atomically. The Routine 1100 then continues to block 1106, where the list is reversed, to convert the list from a stack into a queue. The Routine 1100 then moves to block 1108, where the ProcessList routine is called. The ProcessList routine is described below with reference to FIG. 12.

Figure 12:
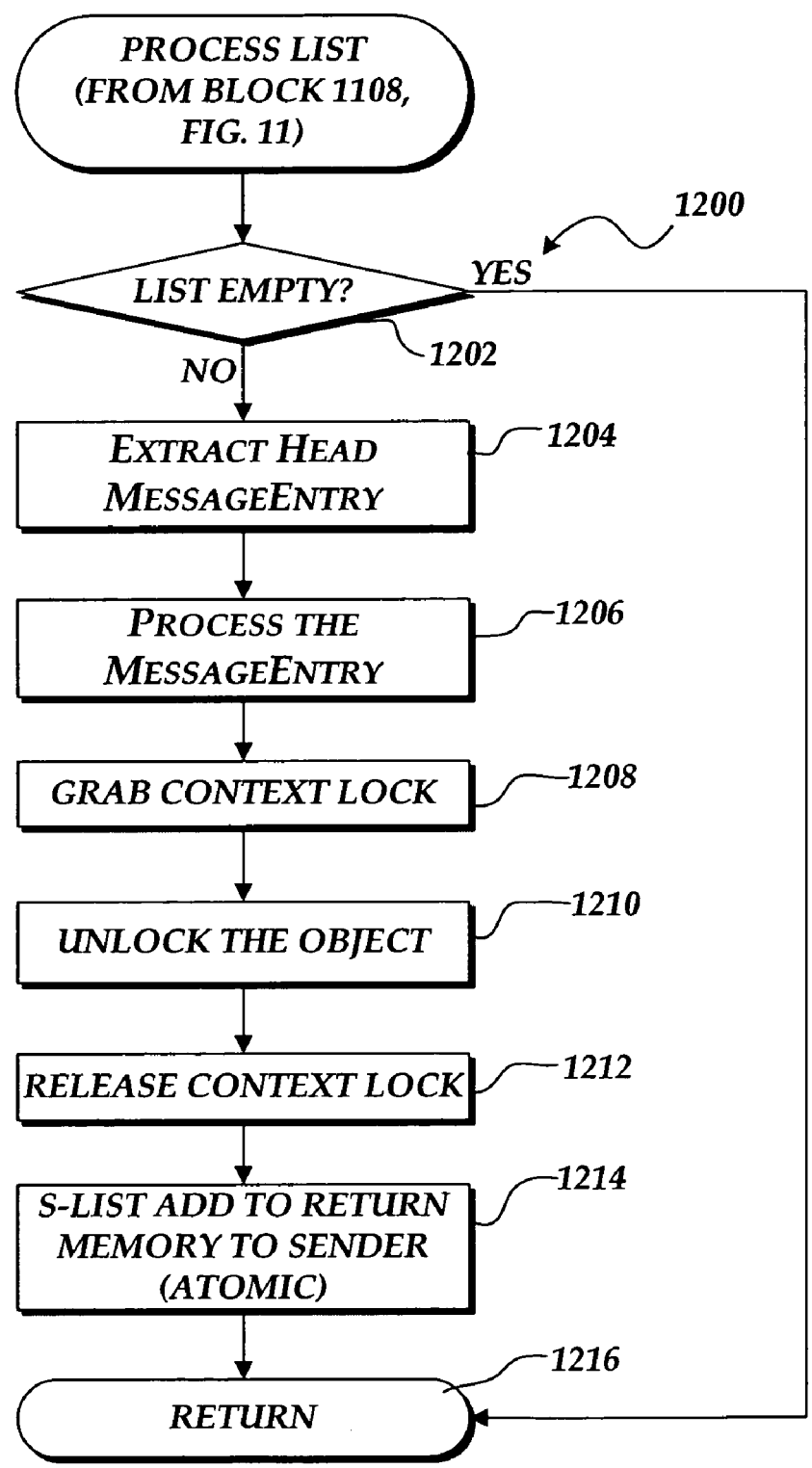
FIG. 12 is a flow diagram showing an illustrative routine for processing an s-list according to an actual embodiment of the present invention.

Turning now to FIG. 12, an illustrative Routine 1200 for implementing the ProcessList routine will be described. The Routine 1200 begins at block 1202, where a determination is made as to whether the S-list is empty. If the S-list is empty, the Routine 1200 branches to block 1216, where it returns. If the S-list is not empty, the Routine 1200 continues to block 1204, where the head message entry is extracted from the list. At block 1206, the message entry is processed. From block 1206, the Routine 1200 continues to block 1208, where the context lock is taken. From block 1208, the Routine 1200 continues to block 1210, where the object is unlocked. At block 1212, the context lock is released. At block 1214, an S-list "add" is atomically performed to return memory to the sender. The Routine 1200 then continues to block 1216, where it returns.

Figure 13:
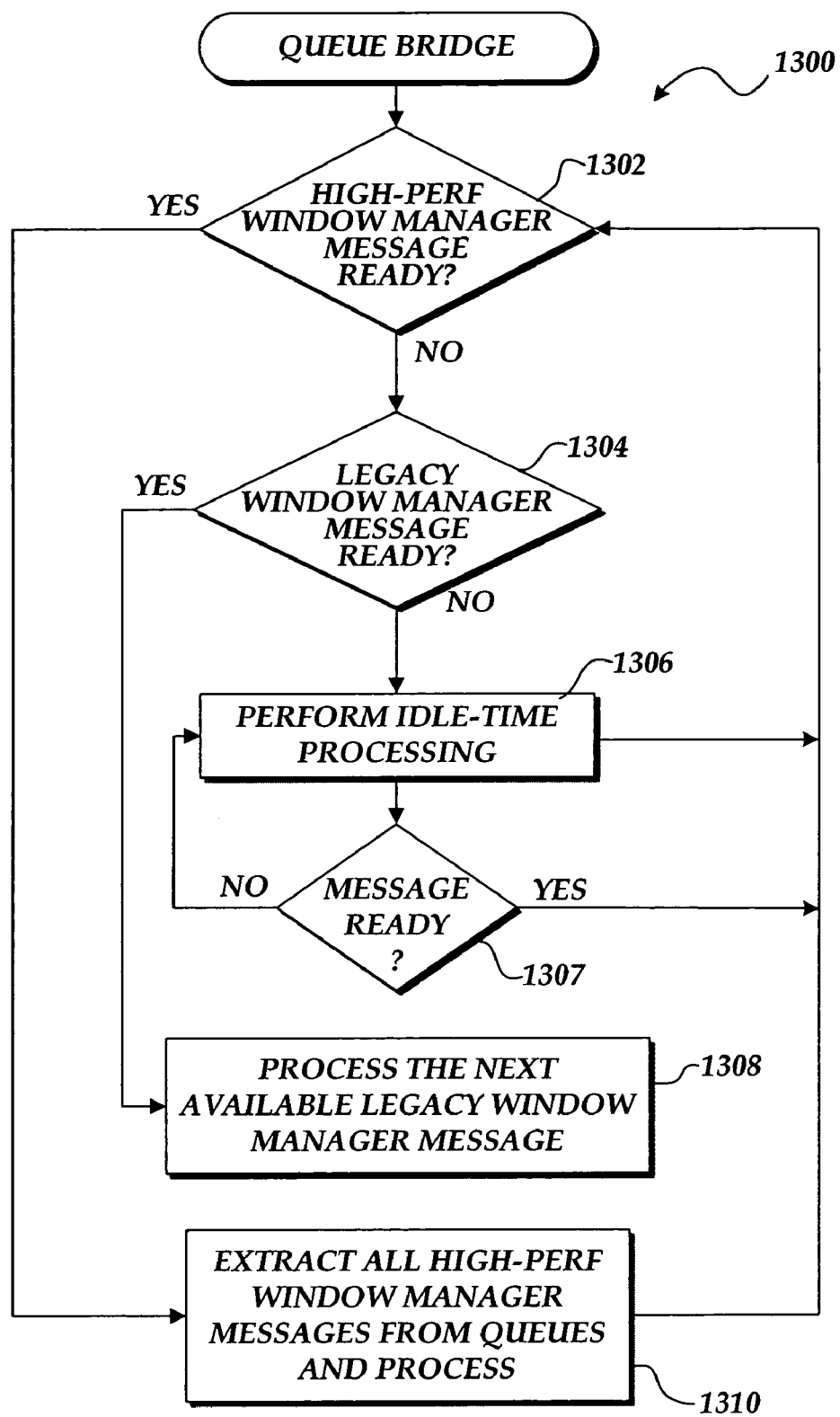
FIG. 13 is a flow diagram showing the operation of a queue bridge for integrating a high-performance message queue with a legacy message queue according to an embodiment of the present invention.

Turning now to FIG. 13, an illustrative Routine 1300 will be described for providing a queue bridge between a window manager utilizing high-performance message queues and a legacy window manager. The Routine 1300 begins at block 1302, where a determination is made as to whether a message has been received from the high-performance window manager. If a message has been received, the Routine 1300 branches to block 1310, where all of the messages in the high-performance message manager queue are extracted and processed. This maintains the constraints required by non-locking queues. As described above, to ensure strict FIFO behavior, only one thread at a time within a context may process messages. The Routine 1300 then returns from block 1310 to block 1302.

If, at block 1302, it is determined that no high-performance window manager messages are ready, the Routine 1300 continues to block 1304. At block 1304, a determination is made as to whether messages are ready to be processed from the legacy window manager. If no messages are ready to be processed, the Routine 1300 continues to block 1306, where idle-time processing is performed. In this manner, background components are given an opportunity to update. Additionally, the wait time until the background components will have additional work may be computed.

If, at block 1304, it is determined that messages are ready to be processed from the legacy window manager, the Routine 1300 branches to block 1306, where the next available message is processed. At decision block 1307, a test is performed to determine whether the operating system has indicated that a message is ready. If the operating system has not indicated that a message is ready, the Routine 1300 returns to block 1306. If the operating system has indicated that a message is ready, the Routine 1300 returns to block 1302. This maintains existing queue behavior with legacy applications. The Routine 1300 then continues from block 1308 to block 1302 where additional messages are processed in a similar manner. Block 1308 saves the state and returns to the caller to process the legacy message.

In light of the above, it should be appreciated by those skilled in the art that the present invention provides a method, apparatus, and computer-readable medium for providing high-performance message queues. It should also be appreciated that the present invention provides a method, apparatus, and computer-readable medium for integrating a high-performance message queue with a legacy message queue.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for posting a message via a high-performance message queue, comprising:
   providing a message queue associated with a context;
   executing a user interface thread associated with said context;
   receiving a request from said user interface thread to post a message to a queue associated with a second context;
   validating parameters associated with said message;
   determining a processing function that should be notified when said message is dequeued;
   completing a message entry for said message including said validated parameters and the identity of said processing function;
   atomically adding said message to said queue associated with said second context, said queue implemented as a singly-linked list, and said atomically adding including locking said message entry and atomically adding said message entry to said singly-linked list; and
   atomically providing an indication to said second context that a message has been posted to said queue associated with said second context.

2. A computer apparatus for posting a message via a high-performance message queue comprising:
   (a) a memory; and
   (b) a processor connected to the memory, wherein the processor is configured to operate in accordance with executable instructions that, when executed, cause the processor to:
   i. provide a message queue associated with a context;
   ii. execute a user interface thread associated with said context;
   iii. receive a request from said user interface thread to post a message to a queue associated with a second context;
   iv. validate parameters associated with said message;
   v. determine a processing function that should be notified when said message is dequeued;

vi. complete a message entry for said message including said validated parameters and the identity of said processing function;
vii. atomically add said message to said queue associated with said second context, said queue implemented as a singly-linked list, and said atomically add including locking said message entry and atomically adding said message entry to said singly-linked list; and
viii. atomically providing an indication to said second context that a message has been posted to said queue associated with said second context.

3. A computer-readable storage medium for performing a method for posting a message via a high-performance message queue, the method comprising:

providing a message queue associated with a context;
executing a user interface thread associated with said context;
receiving a request from said user interface thread to post a message to a queue associated with a second context;
validating parameters associated with said message;
determining a processing function that should be notified when said message is dequeued;
completing a message entry for said message including said validated parameters and the identity of said processing function;
atomically adding said message to said queue associated with said second context, said queue implemented as a singly-linked list, and said atomically adding including locking said message entry and atomically adding said message entry to said singly-linked list; and
atomically providing an indication to said second context that a message has been posted to said queue associated with said second context.

* * * * *